(12) United States Patent
Stoesser et al.

(10) Patent No.: US 12,234,801 B2
(45) Date of Patent: Feb. 25, 2025

(54) HYDROKINETIC TURBINE SYSTEM

(71) Applicant: Emrgy Inc., Atlanta, GA (US)

(72) Inventors: Thorsten Stoesser, London (GB); Tony Morris, Marietta, GA (US); Emily A. Morris, Atlanta, GA (US); Anthony Walsh, Belleville, MI (US); Joseph S. VanSelous, Highland, MI (US); Chester Louis Parys, Garden City, MI (US); Brian David Tutas, Dearborn Heights, MI (US)

(73) Assignee: EMRGY INC., Atlanta, GA (US)

( * ) Notice: Subject to any disclaimer, the term of this patent is extended or adjusted under 35 U.S.C. 154(b) by 0 days.

(21) Appl. No.: 16/089,943

(22) PCT Filed: Mar. 28, 2017

(86) PCT No.: PCT/US2017/024511
§ 371 (c)(1),
(2) Date: Sep. 28, 2018

(87) PCT Pub. No.: WO2017/172747
PCT Pub. Date: Oct. 5, 2017

(65) Prior Publication Data
US 2020/0088159 A1 Mar. 19, 2020

Related U.S. Application Data

(60) Provisional application No. 62/313,856, filed on Mar. 28, 2016.

(51) Int. Cl.
*F03B 17/06* (2006.01)
*H02K 7/10* (2006.01)
(Continued)

(52) U.S. Cl.
CPC ......... *F03B 17/065* (2013.01); *H02K 7/1004* (2013.01); *H02K 7/1823* (2013.01); *H02K 49/102* (2013.01)

(58) Field of Classification Search
CPC ...... F03B 17/065; F03B 17/063; Y02E 10/28; Y02E 10/38; H02K 51/00; H02K 49/102;
(Continued)

(56) References Cited

U.S. PATENT DOCUMENTS 6,109,863 A * 8/2000 Milliken ............... F03B 17/065
415/1
6,320,273 B1 * 11/2001 Nemec .................... F03D 15/10
290/55

(Continued)

FOREIGN PATENT DOCUMENTS

| CN | 103001454 A | 3/2013 |
| CN | 104393725 A | 3/2015 |

(Continued)

OTHER PUBLICATIONS

International Search Report and Written Opinion mailed Jan. 3, 2019 for International Application No. PCT/US2018/051371.
(Continued)

*Primary Examiner* — Charles Reid, Jr.
(74) *Attorney, Agent, or Firm* — Husch Blackwell LLP; Bryan D. Stewart; Andrew C. Landsman

(57) ABSTRACT

Hydrokinetic fluid turbines utilize a flowing body of liquid to translate the kinetic energy of the fluid into electric power or other useful energy. The available kinetic energy is proportional to the squared fluid velocity in an open channel with a fixed cross-sectional area. The proposed twin turbine system coupled with a cycloidal magnetic gear exploits the hydrokinetic energy existing in open-channels.

14 Claims, 10 Drawing Sheets

(51) Int. Cl.
*H02K 7/18* (2006.01)
*H02K 49/10* (2006.01)

(58) Field of Classification Search
CPC .... H02K 7/116; H02K 7/1823; H02K 7/1004; F05B 2260/404; F05B 2240/133; F05B 2250/72
USPC ........................................ 290/54, 53, 43, 42
See application file for complete search history.

(56) References Cited

U.S. PATENT DOCUMENTS

| | | | |
|---|---|---|---|
| 6,793,458 B2 | 9/2004 | Kawai et al. | |
| 7,944,075 B2 * | 5/2011 | Boone | F03D 3/065 |
| | | | 290/55 |
| 8,246,299 B2 | 8/2012 | Razzell et al. | |
| 8,616,829 B2 * | 12/2013 | Becker | F03B 3/04 |
| | | | 290/43 |
| 8,807,917 B2 | 8/2014 | Park et al. | |
| 8,840,364 B2 | 9/2014 | Warton et al. | |
| 8,876,448 B1 | 11/2014 | Hess et al. | |
| 9,041,235 B1 | 5/2015 | Hunter | |
| 9,337,712 B2 | 5/2016 | Storaasli | |
| 9,618,002 B1 | 4/2017 | Cabra et al. | |
| 10,458,386 B2 | 10/2019 | Watanabe et al. | |
| 2002/0197147 A1 | 12/2002 | Kawai et al. | |
| 2004/0232702 A1 | 11/2004 | He et al. | |
| 2007/0020097 A1 | 1/2007 | Ursua | |
| 2007/0063520 A1 * | 3/2007 | Ahmad | F03B 17/063 |
| | | | 290/54 |
| 2008/0018115 A1 | 1/2008 | Orlov | |
| 2008/0084067 A1 * | 4/2008 | Hill | F03B 17/067 |
| | | | 290/4 R |
| 2008/0267777 A1 | 10/2008 | Lux | |
| 2009/0091135 A1 | 4/2009 | Janca et al. | |
| 2009/0129928 A1 * | 5/2009 | Sauer | F03B 17/063 |
| | | | 416/176 |
| 2009/0134623 A1 | 5/2009 | Krouse | |
| 2009/0167028 A1 | 7/2009 | Akamine | |
| 2009/0230686 A1 * | 9/2009 | Catlin | F03B 17/061 |
| | | | 290/54 |
| 2009/0315329 A1 | 12/2009 | Duffey et al. | |
| 2010/0032952 A1 | 2/2010 | Hatch et al. | |
| 2010/0084862 A1 | 4/2010 | Unno | |
| 2010/0194112 A1 * | 8/2010 | Vince | F03D 9/25 |
| | | | 290/53 |
| 2010/0253081 A1 | 10/2010 | Schlabach et al. | |
| 2010/0295316 A1 | 11/2010 | Grassman | |
| 2011/0037333 A1 | 2/2011 | Atallah et al. | |
| 2011/0254271 A1 * | 10/2011 | Freeman | F03B 17/061 |
| | | | 290/42 |
| 2012/0099977 A1 | 4/2012 | Churchill | |
| 2012/0023606 A1 | 9/2012 | Storaasli | |
| 2013/0069369 A1 | 3/2013 | Salehpoor | |
| 2013/0071240 A1 | 3/2013 | Chir et al. | |
| 2013/0099499 A1 | 4/2013 | Levin | |
| 2013/0115045 A1 | 5/2013 | Korac | |
| 2013/0134815 A1 | 5/2013 | Powell et al. | |
| 2013/0266378 A1 | 10/2013 | French, Sr. | |
| 2013/0285383 A1 | 10/2013 | Belarbi | |
| 2013/0285384 A1 | 10/2013 | Schultz et al. | |
| 2013/0334825 A1 * | 12/2013 | Roter | F03D 1/04 |
| | | | 290/55 |
| 2014/0138954 A1 | 5/2014 | Antonucci et al. | |
| 2014/0161642 A1 | 6/2014 | Rajadhyaksha et al. | |
| 2014/0183996 A1 | 7/2014 | He et al. | |
| 2014/0265335 A1 * | 9/2014 | Andreis | F03B 17/063 |
| | | | 290/52 |
| 2015/0226174 A1 | 8/2015 | Duchene et al. | |
| 2015/0343674 A1 | 12/2015 | Lowth et al. | |
| 2016/0010620 A1 | 1/2016 | Han | |
| 2016/0049855 A1 | 2/2016 | Davey | |
| 2017/0030326 A1 | 2/2017 | Han | |
| 2017/0054384 A1 | 2/2017 | Post | |
| 2017/0138333 A1 | 5/2017 | Toran | |
| 2017/0298748 A1 | 10/2017 | Vetters et al. | |
| 2018/0106236 A1 | 4/2018 | Lee | |
| 2020/0025040 A1 | 1/2020 | Meyer et al. | |

FOREIGN PATENT DOCUMENTS

| | | | | |
|---|---|---|---|---|
| EP | 1849999 A2 | 10/2007 | | |
| GB | 2408778 A | 6/2005 | | |
| RU | 2216662 C1 | 11/2003 | | |
| WO | 2006133703 A1 | 12/2006 | | |
| WO | 2011095240 A2 | 8/2011 | | |
| WO | WO-2011160210 A2 * | 12/2011 | | F03B 17/063 |
| WO | 2013143596 A1 | 10/2013 | | |
| WO | WO-2016004506 A1 * | 1/2016 | | F03B 17/063 |

OTHER PUBLICATIONS

International Search Report and Written Opinion mailed Dec. 22, 2016 for International Application No. PCT/US2016/057130.
Davey, "Axial Flux Cycloidal Magnetic Gears", IEEE Transactions on Magnetics 50:4, 2014, 8100607, 7 pages.
Extended European Search Report dated Oct. 28, 2019 for European Pat. Appl. No. 17776448.7.
International Search Report & Written Opinion mailed May 27, 2020 for International PCT Patent Appl. No. PCT/US2020/023693.
International Search Report and Written Opinion mailed Jul. 2, 20227 for international PCT patent application No. PCT/US22/22917.
International Search Report and Written Opinion dated Jun. 22, 2017 in International Patent Application No. PCT/US17/24511.

* cited by examiner

HYDROKINETIC TURBINE SYSTEM

CROSS REFERENCE TO RELATED APPLICATIONS

This application is a national stage entry of, and claims the benefit of and priority to International Patent App. No. PCT/US2017/024511, filed on Mar. 28, 2017, and entitled "TURBINE HYDROKINETIC ENERGY SYSTEM UTILIZING CYCLOIDAL MAGNETIC GEARS", and claims benefit under 35 U.S.C. § 119 of U.S. Provisional Patent Application No. 62/313,856, filed Mar. 28, 2016, and entitled "TWIN-TURBINE HYDROKINETIC ENERGY SYSTEM," all of which are incorporated herein by reference as if set forth herein in their entireties.

GOVERNMENT LICENSE RIGHTS

This invention was made with government support under Award Number DE-EE0007249 awarded by the United States Department of Energy (DoE). The government has certain rights in the invention.

TECHNICAL FIELD

The disclosure relates generally to turbine systems, more particularly to hydrokinetic fluid turbines for open channels. More specifically, the disclosure relates to a twin-turbine hydrokinetic fluid turbine utilizing a cycloidal magnetic gear system.

BACKGROUND

Conventional hydrokinetic turbines consist of a turbine rotor that converts the fluid motion into mechanical torque at the rotor shaft and a power take-off system that converts the mechanical torque into power. In one example a single large-diameter rotor is placed into the center of the open channel with the goal to occupy approximately 66% of the channel's cross-section. If more than 66% of the cross-section is used, the flow is choked and the performance will deteriorate. The large-diameter rotor would not make optimum use of the channel's velocity distribution. A wide rotor creates significant asymmetry of the flow in the channel and the upstroke and downstroke portion of the rotation are subjected to lower velocities and hence power generation is not at its maximum. In a twin, counter-rotating rotor arrangement, such as described herein, the flow through and behind the turbine is symmetric and the wake recovers quicker. The low velocity flow near the banks and the high velocity in the center of the channel allow maximum energy generation.

An important aspect of power take-off of a hydrokinetic turbine is the rotational speed of the rotor. A single rotor of diameter D spins at half the rotational speed than two rotors of diameter d, which is half that of the large-diameter rotor. A large-diameter rotor thus requires a large, heavy and expensive direct-drive generator, whereas the direct drive generator of a rotor of diameter d is considerably smaller, lighter and less expensive. Alternatively, if a gear is employed to gear up the rotational speed of a large single-rotor turbine in order to be able to use a common high-speed generator, the gear ratio of the large-diameter rotor would be twice the gear ratio of a rotor that is half the diameter. A larger gear ratio means greater losses in the gear.

Another important aspect of the turbine is wear and tear, due to vibrations, which occur in vertical axis turbines due to their inherent varying hydrodynamic loadings on the blades as they travel through the highly turbulent fluid on the turbine's circumference. A large-diameter turbine rotor rotates at half the speed as two counter-rotating rotors and hence for the same amount of power output the large diameter rotor produces approximately twice the amount of torque at the shaft than a rotor that is half the diameter and hence the torque at the shaft is only half that of the large-diameter rotor. The lift and drag forces on the blades of a rotor of diameter d are significantly smaller than the lift and drag forces on a rotor of diameter D. Hence, the rotor of diameter d requires significantly smaller shaft, bearings and other structural components. Such counter-rotating rotors lend themselves to use of cycloidal magnetic gears.

Conventional gearboxes or gear systems are used within turbine systems to translate and/or transfer rotation of a low-speed shaft to a high-speed shaft. Specifically, gear systems are used to take the rotation of a low-speed shaft, typically coupled to and/or driven by the turbine component, increase the speed, and provide the increased speed to a generator configured to generate power. The increased speed is provided to the generator via a high-speed shaft. By increasing speed, the generator is capable of generating or creating power by the turbine system.

Conventional gear systems can include a variety of gears. In one example, gear systems for a turbine system can include mechanical, interlocking gears. However, mechanical, interlocking gears can wear and/or deteriorate over time, and often require extensive and regular maintenance to function and/or operate as intended. The maintenance can be costly to both perform and also often requires the turbine system to be shut down, and be inoperable for an extended period of time. Additionally, when the mechanical, interlocking gears wear, fail, break or become inoperable, the gear system and overall turbine system is rendered inoperable until the mechanical gears are fixed or replaced.

In another example gear systems can include magnetic gears. Conventional magnetic gear systems typically include radial flux or planetary magnetic gears, which include multiple sets of concentric magnets and magnetic material in a single casing. In conventional magnetic gears, the components (e.g., magnets) do not contact each other which reduces the risk of mechanical failure. An exemplary cycloidal magnetic gear system is described in IEEE Transactions on Magnetics (Volume: 50, Issue: 4, April 2014), "Axial Flux Cycloidal Magnetic Gears," by Davey et al., which is fully incorporated by reference and made a part hereof. However, these conventional magnetic gears include unique shortcomings that negatively impact the operation of the gear system and turbine system.

Therefore, systems are desired that overcome challenges in the present art, some of which are described above.

BRIEF SUMMARY OF THE DISCLOSURE

Generally, vertical-rotor hydrokinetic turbines perform best if the rotor's solidity, i.e. the portion of the circumference that is occupied by the blades of the turbine, is approx. 30%. Such a rotor operates (i.e. at the peak of the power curve) at a tip-speed ratio (TSR) of TSR≈2, which means that the speed of the blade is approximately twice the speed of the ambient water. Disclosed and described herein is a turbine system with one or more vertical rotors that each feature a very low solidity (approximately 11%), and the rotor operates at TSR≈3 without sacrificing performance. This has the advantage that the disclosed rotors spin faster than conventional vertical axis rotors, which reduces further the lift and drag forces on the blades and the torque at the shaft, and hence creates less wear and tear on the system.

The disclosed rotors require smaller shafts, bearings and other structural components than a conventional high-solidity rotor and improved performance can be realized through use of a cycloidal magnetic gear system.

A turbine system is disclosed. The turbine system comprises twin, vertical counter-rotating turbine rotors, wherein each turbine rotor has a blade solidity of 13 percent, or less. The system further includes a cycloidal gear system in communication with the turbine rotors. The cycloidal gear system comprises an input shaft coupled to the turbine rotors, an orbital bearing plate coupled to the input shaft, the orbital bearing plate comprising at least three orbital bearings. The turbine system also comprises a rotor coupled to the orbital bearing plate and configured to rotate about its own axis and eccentrically rotate about the input/output axis. The rotor of the cycloidal gear system is configured to orbit eccentrically about a center-axis of the input shaft, both stators and output shaft, which are all on the same centerline. The cycloidal gear system further comprises a first magnet ring affixed to the rotor, a second magnet ring affixed to the rotor opposite the first magnet ring, a first stator magnet ring positioned adjacent the first rotor magnet ring affixed to the rotor, and a second stator magnet ring positioned adjacent the second magnet ring affixed to the rotor. Each stator and/or rotor ring may be comprised of a plurality of concentric rings of magnets.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The disclosure will be readily understood by the following detailed description in conjunction with the accompanying drawings, wherein like reference numerals designate like structural elements, and in which.

It is noted that the drawings of the system are not necessarily to scale. The drawings are intended to depict only typical aspects of the system, and therefore should not be considered as limiting the scope of the system. In the drawings, like numbering represents like elements between the drawings.

DETAILED DESCRIPTION

Figure 1A:
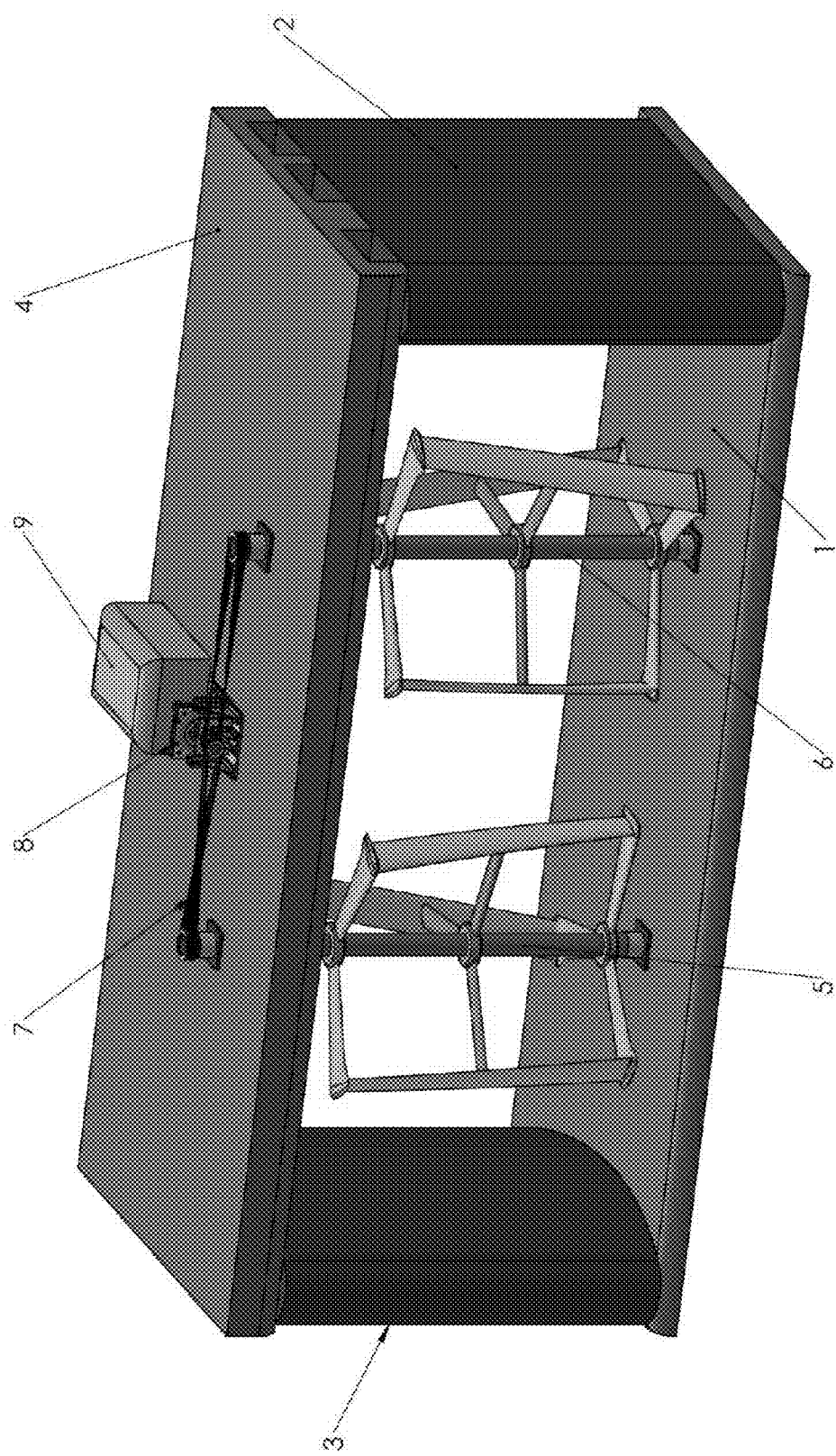
FIG. 1A shows an exemplary embodiment of a twin turbine system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

The following disclosure relates generally to turbine systems, and more particularly to hydrokinetic fluid turbine systems to operate in canals, rivers streams or generally in open-channels and that utilize a cycloidal magnetic gear system.

Disclosed and described herein is a twin-rotor hydrokinetic turbine. Embodiments of the system comprises two rotors, a turbine frame, a belt or chain drive system, a power take-off shaft, a magnetic gearbox and a generator. The two low-solidity rotors may comprise from two to six blades. One of the embodiments comprises three blades and may have six or more arms, a shaft, and two hubs. In one aspect, the turbine system comprises three pulleys and two belts, each twisted and arranged such that the counter rotating motion of the twin rotor is transferred from the vertical to the input shaft of a cycloidal gear system, thereby increasing the speed of each shaft by a factor of two and doubling the torque of one such rotors. The cycloidal magnetic gear system then increases the rotational speed of the power take-off shaft by a factor of approximately 30, thereby reducing the torque by approximately a factor of 30. The generator at the end of the power take-off system comprises a rotor and stator.

Furthermore, a low solidity rotor costs less to manufacture: the chord length and thickness of one blade of a low solidity rotor of diameter d may be less than a quarter of the chord length and thickness of the blade of a high-solidity rotor of diameter D. Consequently the volume of material needed to manufacture one blade of embodiments of the disclosed rotor can be approximately 1/16th the material needed to manufacture a blade of a conventional turbine blade of a rotor of diameter D. The significantly lower size and weight of one blade also has the advantage that the disclosed rotor is lighter and hence it requires smaller rotor arms and bosses, which in turn cost less to manufacture than larger arms and bosses of a large-diameter rotor.

Conventional hydrokinetic turbines comprise one rotor and one power take-off system, the turbine's generator is connected directly with the shaft of the rotor. The disclosed twin-rotor system may comprise one power take-off system for two rotors. The additional cost of a second power take-off system for the second rotor is eliminated. Embodiments of the disclosed power take-off may be comprised of a 2:1 geared belt drive so that the disclosed power take-off shaft rotates approximately six times faster than the shaft of a conventional single-rotor hydrokinetic turbine.

Furthermore, some conventional hydrokinetic turbines use a cantilevered rotor from a bridge. This creates very large bending moments at the shaft. In one embodiment, the disclosed twin turbine comprises a frame and the rotor is fixed via two bearings to the bottom and the top of the frame. This reduces significantly bending moments in the shaft. The frame is designed to funnel the flow via its hydrodynamically optimized sidewalls. This accelerates the water through the frame on the upstream side of the rotors and decelerates the flow on the downstream side of the rotors. This enhances the performance of the system.

In a particular embodiment the twin turbine system provides improved performance and efficiency when operating in an open-channel. Embodiments of the twin turbine system discussed herein converts the kinetic energy head ($v^2/2g$) into mechanical torque and then into electrical power. In detail, the movement of a fluid (e.g., water) is transferred into lift forces of the turbine blades when the fluid moves passed the blades. Because of the rigid connection of the blades with turbine rotor shaft, the lift forces are transferred to the shaft in the form of mechanical torque (T) and creates rotation of the turbine at a given rotational speed ($\omega$). Each of the two rotors of one described embodiment of a twin-turbine system comprises three blades, at least six rotor arms, (generally, three at the top end of the rotor and three at the bottom end of the rotor, and possibly three half way between top end and bottom end in the case of very tall rotors), at least two hubs and a central shaft. Each of the two central shafts is fixed to the turbine structure via bearings, one mounted on the bottom of the structure and one mounted on the top of the structure. The bearings' tasks are to enable smooth rotation of the shaft and to prohibit shaft displacement due to excitatory vibration and/or thrust. A pulley is mounted at the top end of each shaft. Two belts, both of which are twisted by 90 degrees are employed to transfer the torque from each of the two shafts onto a central power takeoff shaft that also has two pulleys attached to its free end. The power take-off shaft may be aligned horizontally or vertically, and is mounted onto the top of the structure via several bearings. The power take-off shaft is basically an extension of the input shaft of the magnetic gearbox that is aligned with the generator. The output shaft of the gearbox drives an electric generator that comprises at least a rotor and a stator.

These and other embodiments are discussed below with reference to FIGS. 1A-1D. However, those skilled in the art will readily appreciate that the detailed description given herein with respect to these Figures is for explanatory purposes only and should not be construed as limiting.

FIG. 1A shows the twin turbine system according to embodiments. The turbine system can include more than the components depicted and discussed herein. As shown in FIG. 1A, the twin turbine system is housed by structure 1-4 and includes turbine rotors 5 and 6, drive belts 7, a gearbox 8 and an electrical generator 9. The two rotors are counter-rotating. For example, rotor 5 may rotate clockwise and rotor 6 may rotate counter-clockwise (or vice versa if the flow is in the opposite direction). The fluid with the highest velocity in the open channel into which the twin turbine system is placed passes through the opening between the two rotors. Fluid with lower velocity will pass through the twin-turbine system along each side of the two rotors. The torque at each rotor shaft and its rotational speed is transferred onto the power take-off via pulleys and two 90 degree twisted belts 7. The high torque, received from both turbine rotors via pulleys and belts, at the slow moving power take-off input shaft is transferred via gearbox 8 onto the gearbox's output shaft with low torque and high rotational speed. The torque at fast rotating shaft is used to generate electrical power via electrical generator 9.

Figure 1B:
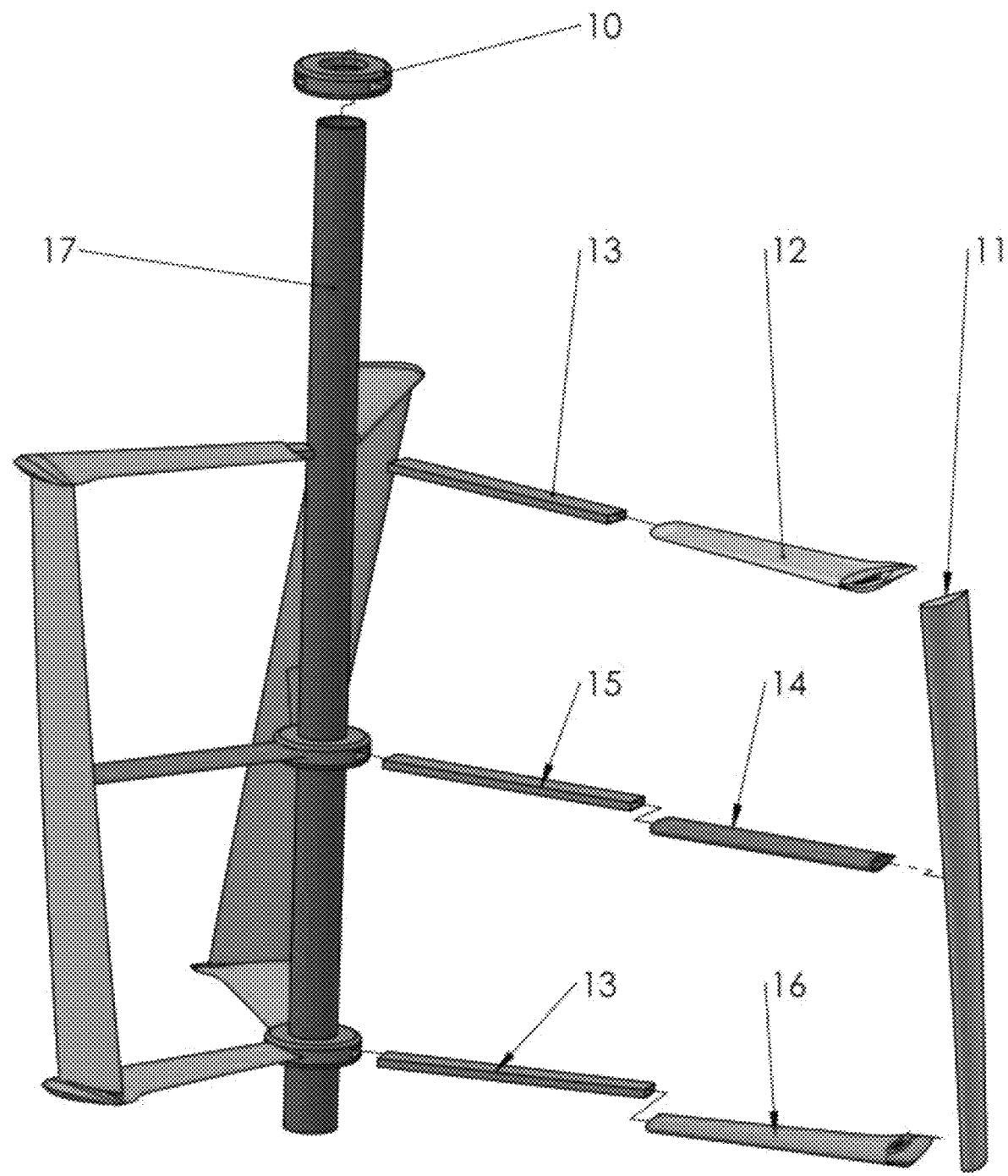
FIG. 1B depicts an exploded view of one of the two twin turbine rotors of FIG. 1A.

FIG. 1B depicts an exploded view of one of the two twin turbine rotors. The rotor is configured as a lift driven vertical axis turbine rotor. As shown in FIG. 1B, the turbine rotor is comprised of a shaft 17 and at least two hubs 10, one at the top of the rotor's shaft 17 and one on the bottom of the of the rotor's shaft 17. The hubs have three slots which are hosting the arms 12, 14, 16 of the rotor and which may contain inserts 13, 15. The arms 12, 14, 16 are connected to blades 11, whereby one arm 12 connects to the top of the blade 11 and one arm 16 connects to the bottom of the blade 11. In embodiments where the rotor is tall, a third arm 14 may be used to connect blade 11 with shaft 17 via a hub approximately halfway between top and bottom hub, with the objective to provide more stability to the blade 11 and to avoid potential bending of the blade 11. The blades 11 of the turbine rotor are shaped in order to maximize the velocity of the fluid that flows over the upper surface of the blade which creates a force that acts perpendicular to the oncoming fluid. This creates lift on the blade and due to the rigid connection between blade and shaft and the distance between blade and shaft, this lift force is transferred to the shaft as torque. The chord length of the blade 11 is chosen so that the turbine rotor can be considered a low-solidity rotor, i.e. the sum of the chord lengths of the three blades divided by the circumference of the spinning rotor is less than 0.13 or 13%. The tangential velocity of each blade 11 when generating maximum mechanical torque is approximately three times the velocity of the fluid in which the turbine operates. The ratio of tangential blade velocity to approach flow velocity is called the tip speed velocity. The described turbine rotor operates at a tip speed velocity ration (TSR) of approximately three. As shown in FIG. 1B, the arms 12, 14, 16 are shaped using a NACA airfoil profile with the objective to minimize the arms' drag force. Upper 12 and lower 16 arms extend over the blade, in fact the magnitude of the overlap is minimum the thickness of the blade. This overlap prevents so-called end effects, i.e. it prevents fluid from above or below to interact with the fluid that passes over the blade. The overlap is performance enhancing and together with the low rotor solidity and the hydrodynamically-optimized shape of the arms which minimizes drag, it facilitates the rotor to rotate at tip-speed ratios around three.

Figure 1C:
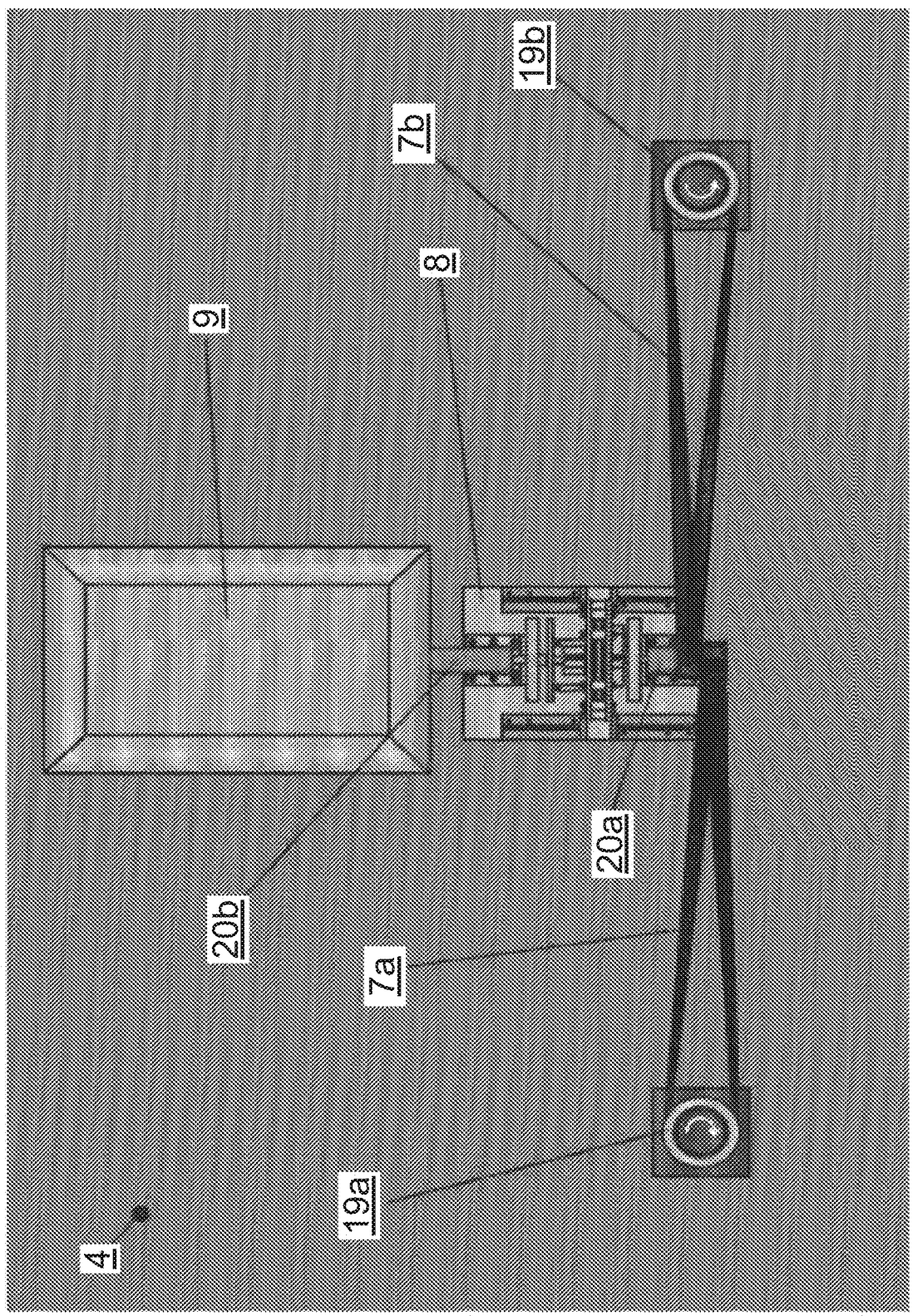
FIG. 1C shows the power take-off of the twin turbine system which is hosted on the top part of the twin turbine support structure 4, as shown in FIG. 1A.

FIG. 1C shows the power take-off of the twin turbine system which is hosted on the top part of the twin turbine support structure 4. As shown in FIG. 1C, the two vertical rotor shafts have pulleys 19a and 19b at the top end of each shaft and two 90 degree twisted belts 7a and 7b transfer rotation and torque onto a single shaft 20a which is oriented horizontally. Shaft 20a is the input shaft to the gearbox 8 and it rotates slowly with high torque. Gearbox 8 multiplies the rotational speed of input shaft 20a onto output shaft 20b, thereby reducing shaft torque. High speed output shaft 20b drives a generator 9.

Figure 1D:
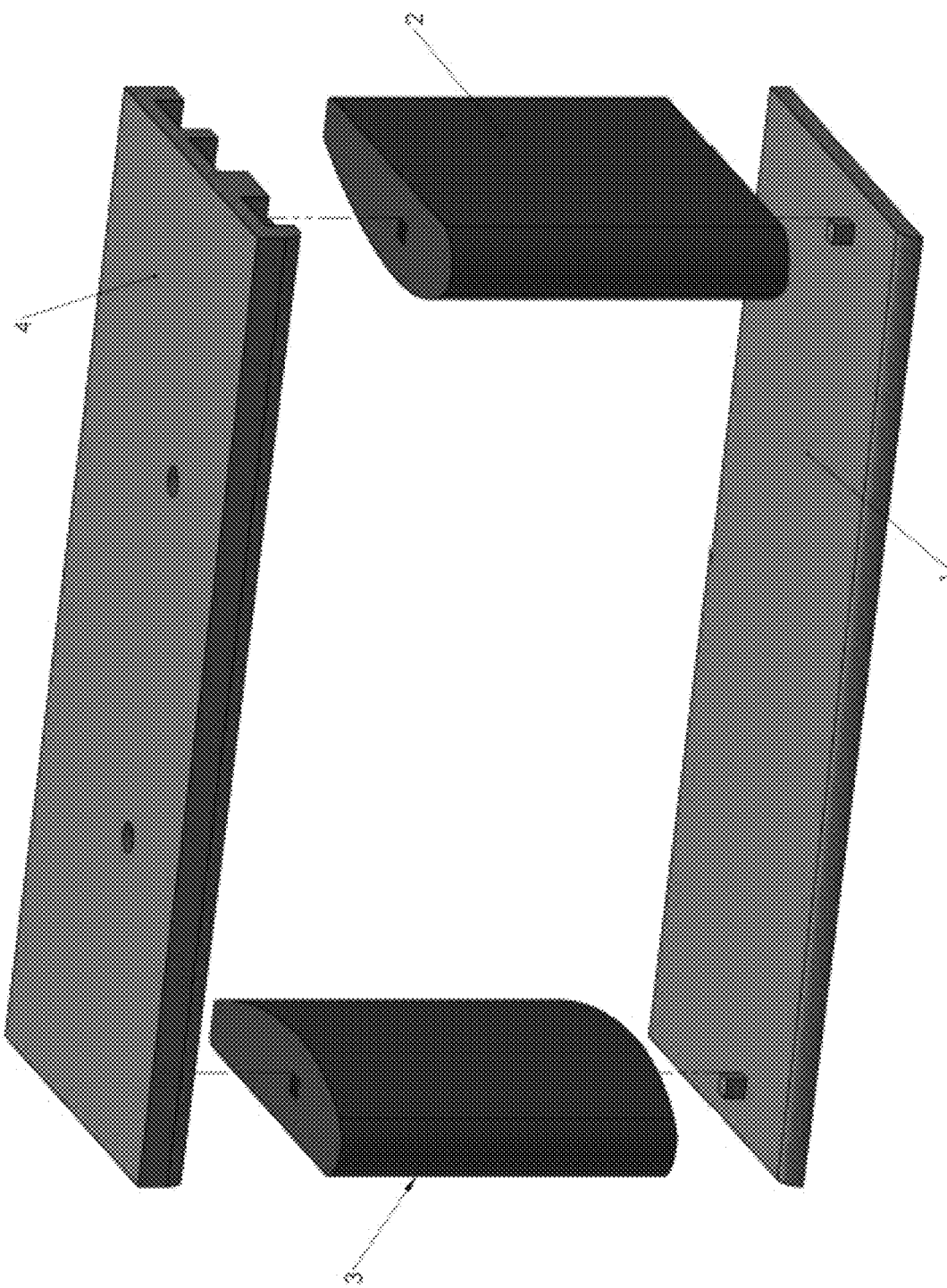
FIG. 1D depicts a turbine frame for the twin turbine system shown in FIG. 1A.

FIG. 1D depicts the structure of the twin turbine system, which may be comprised of a base plate 1, two side walls 2, 3 and a bridge 4. The support structure's task is to host the two rotors and the power take-off system. The support structure also acts as a gravity base, i.e. the turbine system is held in place during operation of the turbine. As shown in FIG. 1D, the sidewalls may be shaped such that flow is accelerated upstream of the turbine axis and decelerated on the downstream side of the twin turbine. Acceleration and deceleration enhance turbine performance.

In a particular embodiment, the axial flux, cycloidal magnetic gear system is utilized in the disclosed turbine system to improve operation and efficiency and reduce maintenance. In a non-limiting example, the cycloidal magnetic gear system discussed herein transmits the mechanical power represented by high torque and low speed of an input shaft to a high-speed shaft rotating in an opposite direction to the input shaft at the same or nearly the same power rating. The cycloidal magnetic gear system includes two or more stator (e.g., stationary) plates, and a rotor coupled through an orbital bearing plate to the low-speed shaft. The rotor is positioned between the two or more stator plates. Each of the stator plates has one or more stationary rings of magnets mounted thereon and in proximity to one side of the rotor. The rotor includes the same number of rings of magnets on each side of the rotor. There can be one or more concentric rings of magnets on each side of the rotor. The rings of magnets on each side of the rotor are proximate to the magnets mounted on the respective stator plates, with an airgap between. As noted, the rings of rotor magnets are affixed to the each side of the rotor, and the rotor is configured to orbit eccentrically about a center-axis of a first one or more stator magnet rings and/or a second one or more stator magnet rings to transfer or translate the low-speed eccentric orbital motion of the rotor to a concentric high-speed rotational motion for the high-speed shaft.

As used herein, the term "eccentric" may refer to a rotation that is off axis or offset from a rotational axis of another component. That is, eccentric rotation may refer to the orbital motion of a component offset from, off axis and/or non-concentric to an axis of another component.

These and other embodiments are discussed below with reference to FIGS. 1E-5. However, those skilled in the art will readily appreciate that the detailed description given herein with respect to these Figures is for explanatory purposes only and should not be construed as limiting.

Figure 1E:
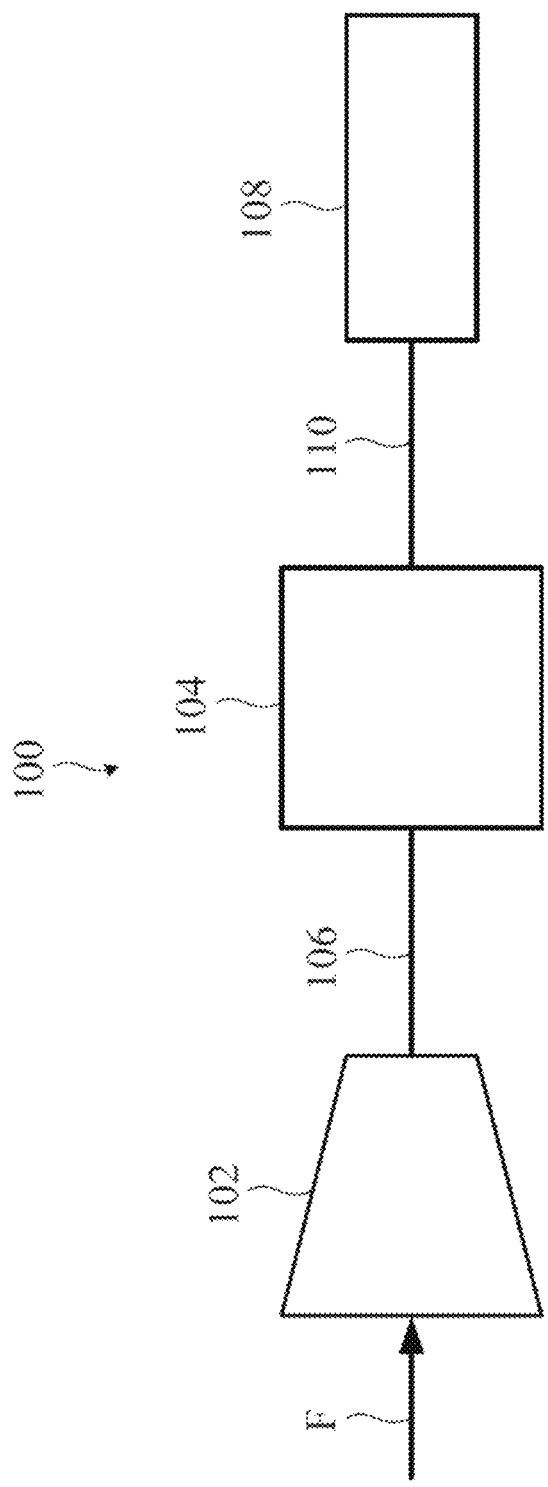
FIG. 1E depicts a schematic view of a turbine system utilizing a cycloidal magnetic gear system, according to embodiments.

FIG. 1E shows a schematic of a turbine system according to embodiments. Turbine system 100 is depicted in basic form, and the parts depicted and discussed herein are not to be understood as exhaustive. That is, turbine system 100 can include more than the components depicted and discussed herein. The components of turbine system 100 may be dependent on, at least in part, the type of turbine system (e.g., wind, combustion, hydro and so on).

As shown in FIG. 1E, turbine system 100 includes a prime mover such as turbine 102. In this instance, turbine 102 comprises the twin-turbine hydrokinetic energy system disclosed and described herein that provides a drive power to turbine system 100. In a non-limiting example, turbine 102 can include a plurality of blades and stators, where a fluid passes through turbine 102 and drives the blades of turbine 102 for providing rotational power to turbine system 100.

Turbine system 100 also includes a gear system 104. As shown in FIG. 1E, gear system 104 is coupled to turbine 102 via low-speed shaft 106. That is, low-speed shaft 106 is coupled to and/or couples turbine 102 and gear system 104. During operation of turbine system 100, when turbine 102 receives the fluid (F), turbine 102 drives and/or rotates low-speed shaft 106, which in turn provides input to gear system 104. As a result of the rotation and/or motion of turbine 102, and its components, when receiving fluid (F), low-speed shaft 106 can rotate. That is, low-speed shaft 106 may rotate completely concentrically or about an axis of shaft 106 of the turbine 102. As discussed herein, gear system 104 is configured as an axial flux, cycloidal magnetic gear system that improves operation of turbine system 100.

As shown in FIG. 1E, gear system 104 is coupled to generator 108. Gear system 104 is coupled to generator 108 via high-speed shaft 110. During operation of turbine system 100, gear system 104 receives the input from low-speed shaft 106, and consequently transfers or translates the rotation of low-speed shaft 106 to a concentric rotational input to generator 108 via high-speed shaft 110. Generator receives this rotational input from high-speed shaft 110 and provides electrical power or electrical signal(s) to auxiliary components or devices powered by turbine system 100.

Figure 2:
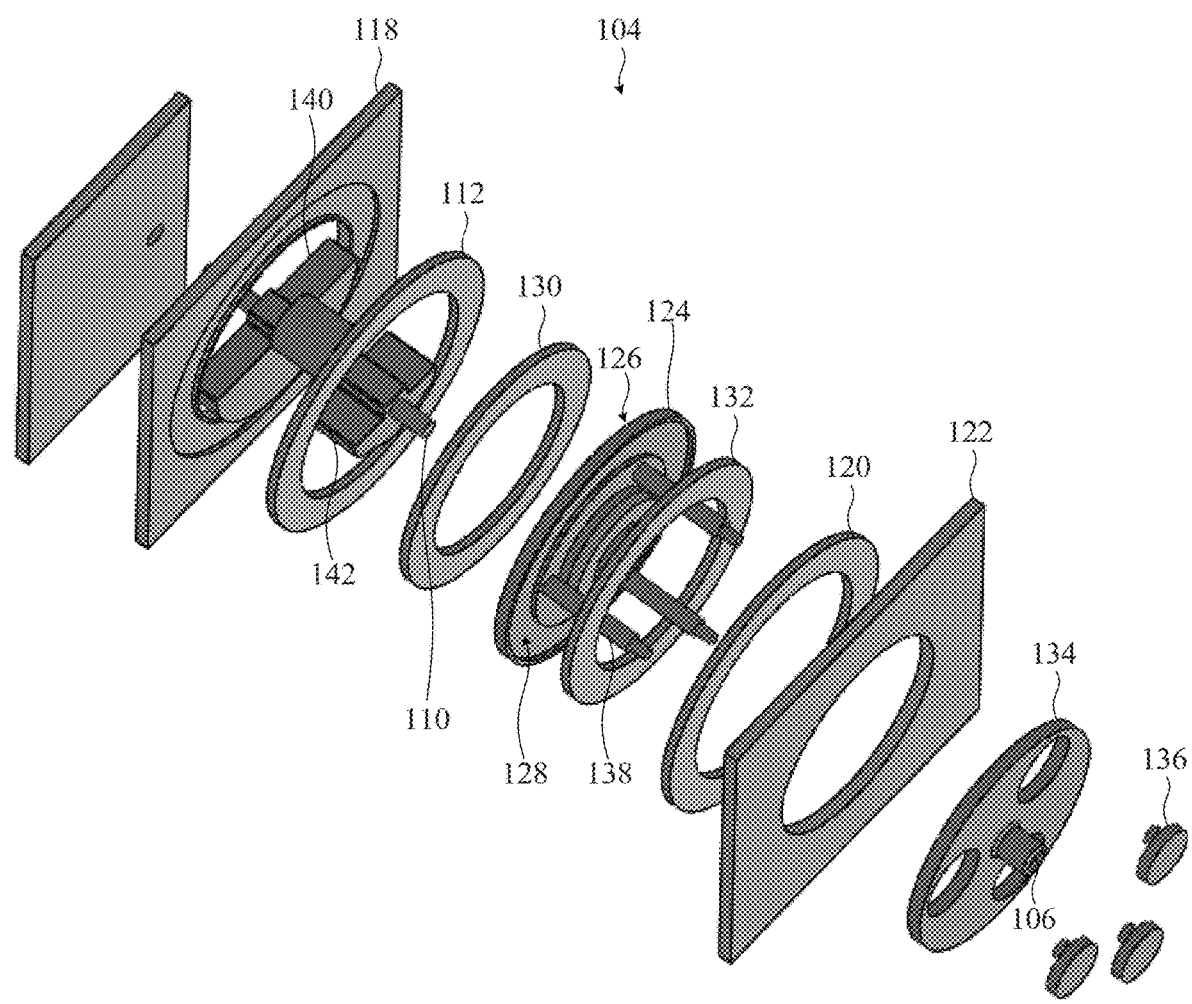
FIG. 2 depicts an exploded view of a cycloidal magnetic gear system utilized within a turbine system, according to embodiments.

FIG. 2 shows an exploded view of an embodiment of a gear system 104 that can be utilized by turbine system 100. It is understood that similarly numbered and/or named components may function in a substantially similar fashion. Redundant explanation of these components has been omitted for clarity.

As shown in FIG. 2, gear system 104 includes a first stator magnet ring 112. As discussed herein in detail, first stator magnet ring 112 includes a plurality of magnets positioned or aligned to form one or more rings, where each magnet has an alternate or distinct polarity from the magnet positioned on either side or is arranged in a full or partial Halbach array, as is known to one of ordinary skill in the art. The number of magnets (pole pairs) used to form first stator magnet ring 112 can be used to set the gear ratio of the magnetic gear system 104. The size and torque of the gear system 104 is defined by the air gap distance the stator and a rotor of the gear system 104 as well as the diameter of the magnetic rings. The required size and/or torque of the gear system 104 is determined by the power generated by turbine system 100. In non-limiting examples, the number of magnets used to form first stator magnet ring 112 can be between approximately 10 and 124 magnets. In other embodiments, more than 124 magnets may be used. First stator magnet ring 112 may be coupled to and/or affixed to a first stator plate 118. First stator plate 118 may be substantially fixed and/or rigid and in a non-limiting example, may form a portion of a housing for gear system 104. During operation of turbine system 100, and specifically gear system 104, first stator magnet ring 112 is fixed and/or does not move.

Gear system 104 also includes a second stator magnet ring 120. Similar to first stator magnet ring 112, second stator magnet ring 120 includes a plurality of magnets positioned or aligned to form one or more rings, where each magnet has an alternate or distinct polarity from the magnet positioned on either side or is arranged in a full or partial Halbach array, as is known to one of ordinary skill in the art. As shown in FIG. 2, second stator magnet ring 120 is positioned opposite first stator magnet ring 112 in gear system 104. In a non-limiting example, second stator magnet ring 120 may be substantially identical in size and/or in the number of magnets as first stator magnet ring 112. Additionally, the number and/or size of magnets used to form first stator magnet ring 112 may be different than the number of magnets forming second stator magnet ring 120. Second stator magnet ring 120 may be coupled to and/or affixed to a second stator plate 122. Like first stator plate 118, second stator plate 122 may be substantially fixed and/or rigid and in a non-limiting example, may form a portion of a housing for gear system 104, along with and/or in conjunction with first stator plate 118. During operation of turbine system 100, and specifically gear system 104, second stator magnet ring 120 is fixed and/or does not move.

Though not shown in FIG. 2 (see FIGS. 5 and 6), in embodiments the first stator magnet ring 112 and the second stator ring 120 may be comprised of two or more concentric rings of magnets. For example, the first stator magnet ring 112 may comprise a first outer stator magnet ring and a first inner stator magnet ring concentrically located on the first stator plate 118 where the first outer stator magnet ring has an inner diameter that is larger than the outer diameter of the first inner stator magnet ring. Similarly, the second stator magnet ring 120 may comprise a second outer stator magnet ring and a second inner stator magnet ring concentrically located on the second stator plate 122 where the second outer stator magnet ring has an inner diameter that is larger than the outer diameter of the second inner stator magnet ring. In one non-limiting example, the first and second outer stator magnet rings have outer diameters of approximately 925 mm and the first and second inner stator magnet rings have outer diameters of approximately 675 mm. Furthermore, the first outer stator magnet ring may have a different number of magnets than the first inner stator magnet ring. Similarly, the second outer stator magnet ring may have a different number of magnets than the second inner stator magnet ring.

As shown in FIG. 2, gear system 104 includes a rotor 124. Rotor 124 is in communication with and/or coupled to high-speed shaft 110 of turbine system 100 (see, FIG. 1E). Although shown as being coupled to low-speed shaft 106 through orbital bearing plate 134 and orbital bearings 136, rotor 124 rotates at the high speed of the device and is in communication with high-speed shaft 110. The torque and speed of rotor 124 is transferred to high-speed shaft 110. Rotor 124 is positioned between first stator magnet ring 112 and second stator magnet ring 120. Additionally, and as shown in FIG. 2, rotor 124 is also positioned between first stator plate 118 and second stator plate 122. Rotor 124 includes a first side 126 positioned adjacent first stator magnet ring 112, and second side 128 opposite first side 126. Second side 128 of rotor 124 is positioned adjacent second stator magnet ring 120. As a result of being coupled to low-speed shaft 106, rotor 124 is configured to rotate about its own axis and orbit eccentrically about the input/output axis. As discussed herein, rotor 124 is configured to eccentrically orbit about a center-axis of first stator magnet ring 112 and/or second stator magnet ring 120.

A first rotor magnet ring 130 and a second rotor magnet ring 132 may be coupled and/or affixed to respective sides 126, 128 of rotor 124. As shown in FIG. 2, first rotor magnet ring 130 may be affixed to first side 126 of rotor 124, and may be positioned adjacent the first stator magnet ring 112. Additionally as shown in FIG. 2, second rotor magnet ring 132 may be affixed to second side 128 of rotor 124, and may be positioned adjacent the second stator magnet ring 120. First rotor magnet ring 130 and second rotor magnet ring 132 may be affixed to rotor 124 such that first rotor magnet ring 130 and second rotor magnet ring 132 may not move independent of rotor 124 and/or may move with rotor 124 as rotor 124 eccentrically orbits, as discussed herein. As shown in FIG. 2, a first airgap exists between the first rotor magnet ring 130 and the first stator magnet ring 112 and a second airgap exists between the second rotor magnet ring 132 and the second stator magnet ring 120. The distance of the air gaps is determined by the size and/or torque requirements of the gear system 104. The rotor 124 may be centered between the first 118 and second 122 stator plates, or the rotor 124 may be slightly biased toward one stator plate in order to increase magnetic flux and therefore torque transmission in one rotor-stator interaction and decrease magnetic flux and therefore torque transmission on the other rotor-stator interaction. In one non-limiting example, the first airgap is approximately the same as the second airgap. In another non-limiting example, the first air gap is smaller than the second air gap. In yet another non-limiting example, the second air gap is smaller than the first air gap. Non-limiting examples for air gap distances are between approximately 3 and 9 mm. In one non-limiting example, the first air gap is approximately 3.5 mm and the second air gap is greater than 3.5 mm. Gear system 104 may include a device for adjusting the first airgap and/or the second airgap. For example, a screw mechanism may be used to adjust the distance between the rotor 124 and the first stator plate 118 and/or second stator plate 122, thereby affecting a change in the first airgap and/or the second airgap.

Similar to stator magnet rings 112, 120, first rotor magnet ring 130 and second rotor magnet ring 132 are formed from a plurality of magnets positioned or aligned to form one or more rings, where each magnet has an alternate or distinct polarity from the magnet positioned on either side or is arranged in a full or partial Halbach array, as is known to one of ordinary skill in the art. The number of magnets (pole pairs) used to form first rotor magnet ring 130 and second rotor magnet ring 132, respectively is dependent on, at least in part, the gear ratio for the gear system 104. The airgap between rotor 124 and stator plates 118, 122, as well as the diameters of magnet rings 112, 130, 132, 120 is dependent on, at least in part, the size and/or the torque generated by turbine system 100. Additionally, the number of magnets used to form first rotor magnet ring 130 may be identical or distinct from the number of magnets forming second rotor magnet ring 132. In non-limiting examples, the number of magnets used to form first rotor magnet ring 130 and second rotor magnet ring 132, respectively, can be between approximately 8 and 120 magnets. In some embodiments, the number of magnets can be greater than 120.

Though not shown in FIG. 2 (see FIGS. 5 and 6), in embodiments the first rotor magnet ring 130 and the second rotor magnet ring 132 may be comprised of two or more concentric rings of magnets. For example, the first rotor magnet ring 130 may comprise a first outer rotor magnet ring and a first inner rotor magnet ring concentrically located on the rotor 124 where the first outer rotor magnet ring has an inner diameter that is larger than the outer diameter of the first inner rotor magnet ring. Similarly, the second rotor magnet ring 132 may comprise a second outer rotor magnet ring and a second inner rotor magnet ring concentrically located on the rotor 124 where the second outer rotor magnet ring has an inner diameter that is larger than the outer diameter of the second inner rotor magnet ring. In one non-limiting example, the first and second outer rotor magnet rings have outer diameters of approximately 875 mm and the first and second inner rotor magnet rings have outer diameters of approximately 625 mm. Furthermore, the first outer rotor magnet ring may have a different number of magnets than the first inner rotor magnet ring. Similarly, the second outer rotor magnet ring may have a different number of magnets than the second inner rotor magnet ring.

Furthermore, the magnets used for the first stator magnet ring 112 and the second stator magnet ring 120 may have a radial length that is different than the radial length of the magnets used for the first rotor magnet ring 130 and the second rotor magnet ring. In one non-limiting example, the first stator magnet ring 112 and the second stator magnet ring 120 are comprised of magnets having a radial length that is 1.5 times the radial length of the magnets that comprise the first rotor magnet ring 130 and the second rotor magnet ring.

The number of magnets forming first rotor magnet ring 130 and second rotor magnet ring 132 may be distinct from the number of magnets forming first stator magnet ring 112 and second stator magnet ring 120. In a non-limiting example, the number of magnets forming first rotor magnet ring 130 may be less than the number of magnets forming first stator magnet ring 112. Additionally, the number of magnets forming second rotor magnet ring 132 may be less than the number of magnets forming second stator magnet ring 120. The difference in the number of magnet pole pairs between the stator magnet ring 112, 120 and the rotor magnet ring 130, 132 aid in the operation and/or rotation of rotor 124 within gear system 104.

Gear system 104 of turbine system 100 (see, FIG. 1E) may also include an orbital bearing plate 134. Orbital bearing plate 134, as shown in FIG. 2, may be coupled to low-speed shaft 106, and may receive and/or rotate based on the torque and speed inputs provided by low-speed shaft 106. Orbital bearing plate 134 may also be coupled to rotor 124 for moving or rotating rotor 124 during operation. As shown in FIG. 2, orbital bearing plate 134 includes at least three orbital bearings 136 that may be coupled to a corresponding pin(s) 138 of rotor 124. In various embodiments, orbital bearing plate 134 may include more or fewer than three orbital bearings 136. The pins 138 of rotor 124 may be positioned adjacent to and/or may be substantially surrounded by second rotor magnet ring 132 affixed to second side 128 of rotor 124. Using orbital bearing plate 134, orbital bearing 136 and pins 138, the rotation of low-speed shaft 106 may be transferred and/or translated to rotor 124 to rotate rotor 124, while also providing eccentric orbiting to rotor 124, which is coupled to high-speed shaft 110.

Gear system 104 may also include one or more counterweight on high-speed shaft 110. In a non-limiting example shown in FIG. 2, gear system 104 may include a first counterweight 140 coupled to high-speed shaft 110. First counterweight 140 may be positioned adjacent first stator magnet ring 112 of gear system 104. In the non-limiting example shown in FIG. 2, gear system 104 may also include a second counterweight 142 coupled to high-speed shaft 110. Second counterweight 142 may be positioned adjacent second stator magnet ring 120. Additionally, second counterweight 142 may be positioned between second stator magnet ring 120 and orbital bearing plate 134 in gear system 104.

In one non-limiting example, gear system 104 has a 30:1 gear ratio (i.e., one complete turn of low-speed shaft 106 results in 30 complete turns of high-speed shaft 110), though other gear ratios are contemplated within the scope of this disclosure. For example, the low-speed input may be 40 rpm while the high-speed output may be 1200 rpm. Similarly, the gear system may be used with generators 108 of different output power. As non-limiting examples, the gear system 104 may drive a generator 108 having an output power of 5 kW, 10 kW, up to 100 kW, or higher.

Generally, in operation of the gear system 104, torque on the input shaft is transmitted through an orbital plate to a series of bearings placed on a large diameter of this plate. Inside the series of bearings are drive torque transmitting disks that have a smaller bearing that is placed at a given offset from the center of the disk. A series of pins are located in each one of the smaller bearings. Each one of the pins are connected to a flange that is attached to the rotor. The rotor has a set of bearings that let the rotor spin independently of the output shaft. The rotor assembly is also on the same offset as the torque disks to the output shaft. The rotor assembly has rings of magnets on each side of it. In one exemplary embodiment the rings of magnets are aligned in a Halbach arrangement. On each side of the rotor assembly are stationary stator magnetic rings that are placed at a distance to provide an air gap between the magnetic rings. In one exemplary embodiment the stationary stator magnetic rings are Halbach arranged. As the input shaft starts to turn, the magnetic fields on both sides of the rotor try to prevent the rotor from spinning forcing the output shaft to turn in the opposite direction at the increased speed of the ratio of the magnetic poles.

Figure 3A:
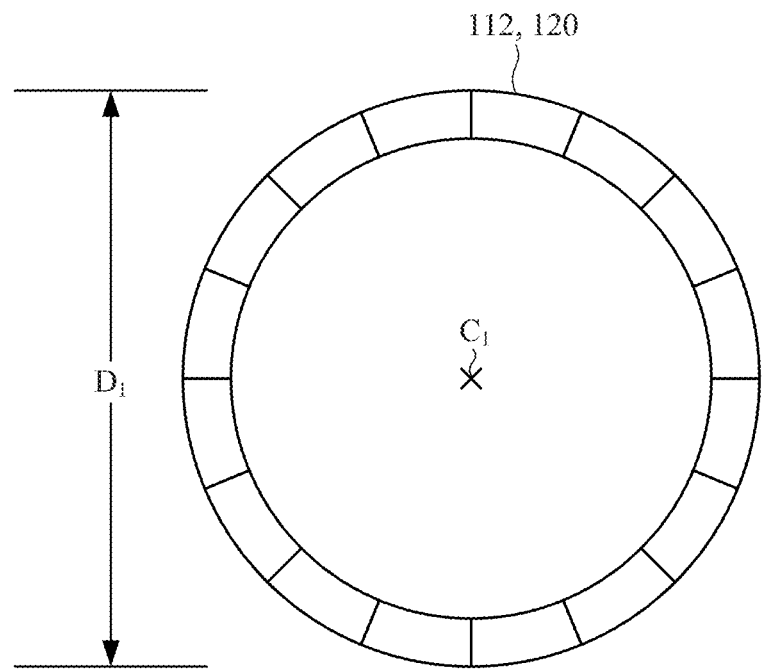
FIG. 3A depicts a front view of a stator magnet ring of the cycloidal magnetic gear system shown in FIG. 2, according to embodiments.
Figure 3B:
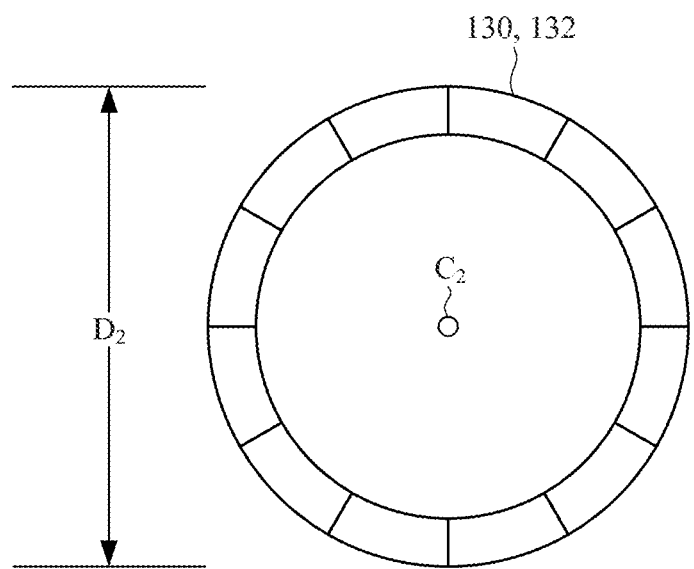
FIG. 3B depicts a front view of a rotor magnet ring of the cycloidal magnetic gear system shown in FIG. 2, according to embodiments.

FIGS. 3A and 3B show front views of non-limiting examples of stator magnet ring 112, 120 and rotor magnet ring 130, 132, respectively, of gear system 104 (see, FIG. 2). As discussed herein, first stator magnet ring 112 and second stator magnet ring 120 may be substantially identical, and first rotor magnet ring 130 and second rotor magnet ring 132 may also be substantially identical. As such, stator magnet ring 112, 120 discussed with respect to FIG. 3A, and rotor magnet ring 130, 132 discussed with respect to FIG. 3B may be described generally and may represent each of both of the respective magnet rings of gear system 104 (see, FIG. 2) discussed herein. As shown in FIGS. 3A and 3B, stator magnet ring 112, 120 and rotor magnet ring 130, 132 are formed from a number of magnets, having alternating polarities. As discussed herein and shown in FIGS. 3A and 3B, the number of magnets forming stator magnet ring 112, 120 is greater than the number of magnets forming rotor magnet ring 130, 132. The number of magnets shown in FIGS. 3A and 3B forming stator magnet ring 112, 120 and rotor magnet ring 130, 132, respectively, are merely exemplary and are not to be considered limiting. The only constraint on the number of magnets is that complete pole pairs are formed.

Additionally as shown in FIGS. 3A and 3B, the diameter ($D_1$) of stator magnet ring 112, 120 is distinct from the diameter ($D_2$) of rotor magnet ring 130, 132. In a non-limiting example, the diameter ($D_1$) of stator magnet ring 112, 120 is larger than the diameter ($D_2$) of rotor magnet ring 130, 132. The difference in diameter may aid in the movement and/or eccentric rotation of rotor magnet ring 130, 132 about stator magnet ring 112, 120 and ultimately the reaction of rotor 124.

Figure 4A:
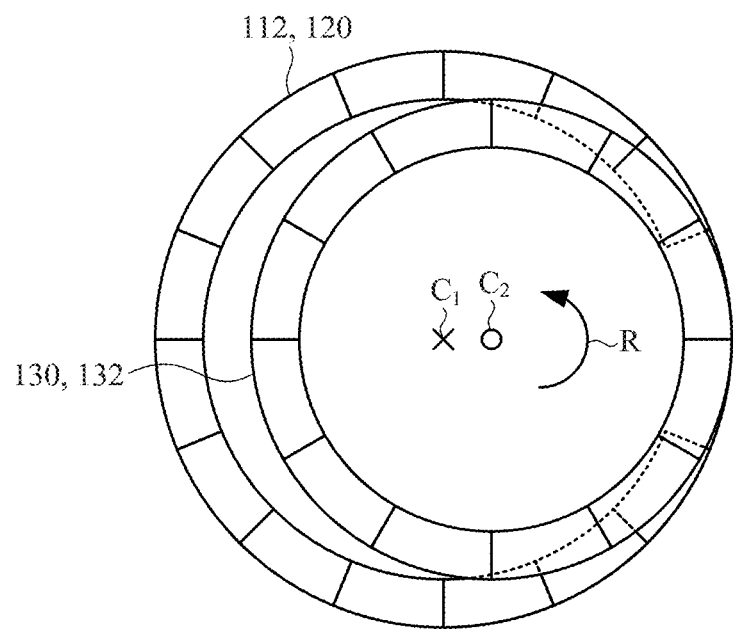
FIGS. 4A-4C depict an eccentric movement of a rotor magnet ring with respect to a stator magnet ring of the cycloidal magnetic gear system shown in FIG. 2, according to embodiments.
Figure 4B:
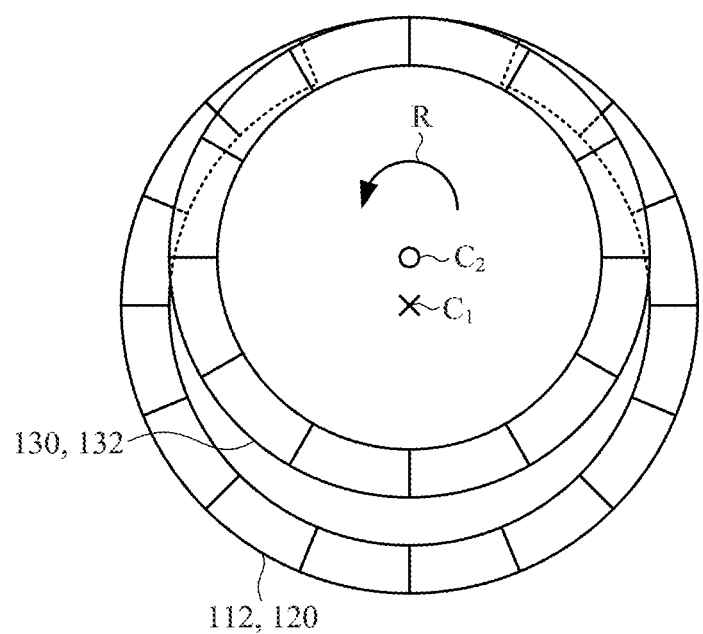
Figure 4C:
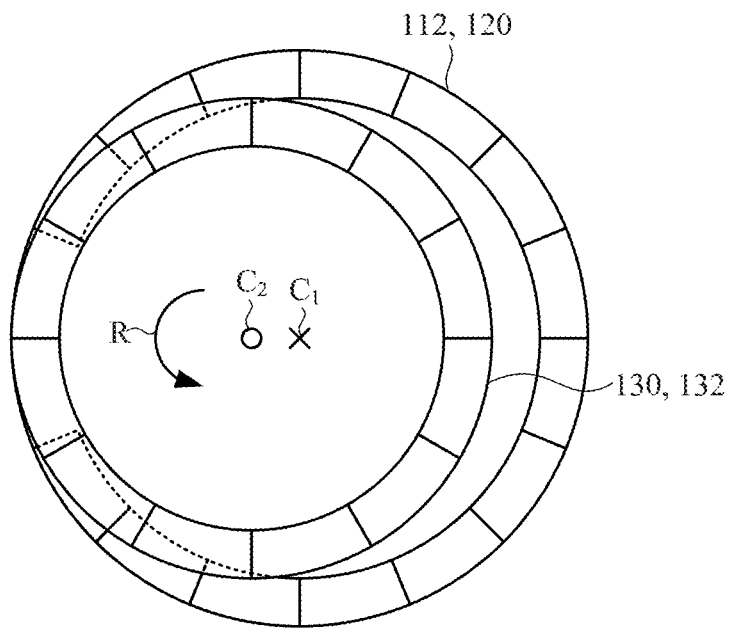

The movement or eccentric orbit of rotor 124 (not shown) and/or rotor magnet ring 130, 132 about center-axis (C1) stator magnet ring 112, 120 is shown in FIGS. 4A-4C. Rotor 124 is omitted from FIGS. 4A-4C for clarity. However, as discussed above, the eccentric orbital movement of rotor magnet ring 130, 132 is a result of being affixed to rotor 124, which also eccentrically orbits about center-axis (Ci) stator magnet ring 112, 120. Additionally, although only a single stator magnet ring 112, 120 and rotor magnet ring 130, 132 is shown, it is understood that the stator magnet ring 112, 120 and the rotor magnet ring 130, 132 shown in FIGS. 4A-4C may represent the interaction between first stator magnet ring 112 and first rotor magnet ring 130 and/or the interaction between second stator magnet ring 120 and second rotor magnet ring 132 of gear system 104.

As shown in FIGS. 4A-4C rotor magnet ring 130, 132 may be positioned over and/or in front of stator magnet ring 112, 120. As discussed herein, rotor magnet ring 130, 132 move or eccentrically orbit about center-axis ($C_1$) of stator magnet ring 112, 120. That is, and as more clearly shown when comparing FIGS. 4A-4C, as rotor magnet ring 130, 132 rotates in a direction (R), the center-axis ($C_2$) of rotor magnet ring 130, 132 also rotates about center-axis ($C_1$) of stator magnet ring 112, 120. Additionally as shown in FIGS. 4A-4C, as a result of rotor magnet ring 130, 132 eccentrically orbits in the opposite direction about or with respect to stator magnet ring 112, 120, center axis ($C_2$) of rotor magnet ring 130, 132 may be positioned between center-axis ($C_1$) of stator magnet ring 112, 120 and the magnets forming rotor magnet ring 130, 132 that are positioned over and/or in front of the magnets forming stator magnet ring 112, 120.

Rotor magnet ring 130, 132 may move or eccentrically orbit about stator magnet ring 112, 120 as a result of the rotation of rotor 124, as discussed herein. Additionally, the polarities of each of the magnets for rotor magnet ring 130, 132 and stator magnet ring 112, 120 may aid in the movement and/or rotation of rotor magnet ring 130, 132. Specifically, the corresponding and/or overlapping magnets for rotor magnet ring 130, 132 and stator magnet ring 112, 120 may be of similar polarities, such that the magnets of stator magnet ring 112, 120 may repel the magnets of rotor magnet ring 130, 132 and push or react against rotor magnet ring 130, 132 along its rotational path in the rotational direction (R). The repelling and/or reaction against rotor magnet ring 130, 132 using stator magnet ring 112, 120 may increase the rotational orbiting speed by rotor magnet ring 130, 132, and consequentially the high speed shaft 110, within gear system 104 (see, FIG. 2).

Figure 5:
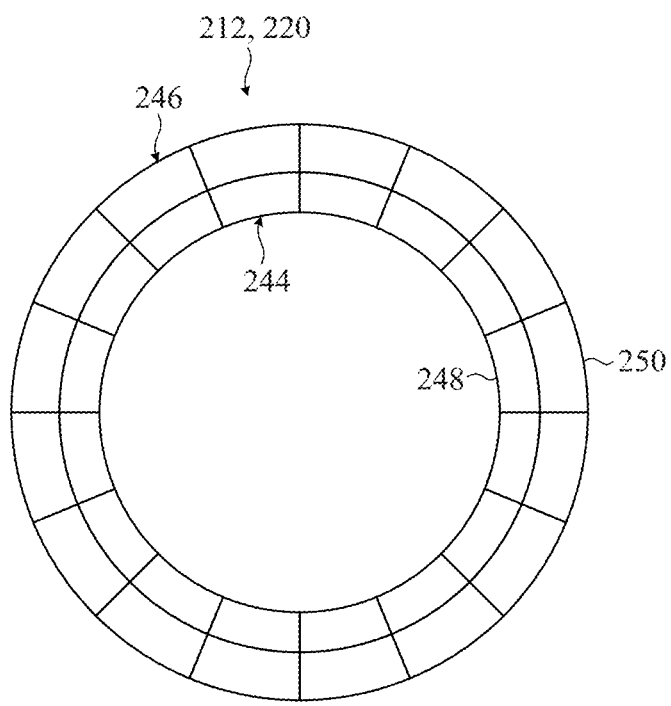
FIG. 5 depicts a front view of a stator or rotor magnet ring of the cycloidal magnetic gear system shown in FIG. 2 including an inner magnet ring and an outer magnet ring, according to additional embodiments.

FIG. 5 shows a stator or a rotor magnet ring 212, 220 according to an additional non-limiting example. As shown in FIG. 5, stator or rotor magnet ring 212, 220 may include two distinct groups of magnets. Specifically, stator or rotor magnet ring 212, 220 may include an inner magnet ring 244, and an outer magnet ring 246 substantially surrounding and/or contacting inner magnet ring 244. Inner magnet ring 244 and outer magnet ring 246 may be substantially concentric. As similarly discussed herein, both inner magnet ring 244 and outer magnet ring 246 may be formed from a plurality of magnets positioned or aligned to form a ring, where each magnet has an alternate or distinct polarity from the magnet positioned on either side or may be arranged in a full or partial Halbach arrangement. The number of magnets used to form inner magnet ring 244 and outer magnet ring 246 is dependent on, at least in part, the size and/or the power generated by turbine system 100. In non-limiting examples, the number of magnets used to form each of inner magnet ring 244 and outer magnet ring 246 is between approximately 10 and 124, or more, magnets. In a non-limiting example shown in FIG. 5, the number of magnets forming inner magnet ring 244 may be identical to the number of magnets forming outer magnet ring 246. In another non-limiting example, the number of magnets forming inner magnet ring 244 may be greater than or less than the number of magnets forming outer magnet ring 246.

Additionally, the polarity of each magnet forming inner magnet ring 244 may be identical or distinct to the polarity of the corresponding magnet forming outer magnet ring 246. As shown in FIG. 5, magnet 248 of inner magnet ring 244 and magnet 250 of outer magnet ring 246 are positioned adjacent one another and/or are corresponding magnets for inner magnet ring 244 and outer magnet ring 246, respectively. In a non-limiting example, magnet 248 of inner magnet ring 244 may include a polarity that is substantially identical to a polarity of magnet 250 of outer magnet ring 246. In another non-limiting example, magnet 248 of inner magnet ring 244 may include a polarity that is distinct from the polarity of magnet 250 of outer magnet ring 246.

Figure 6:
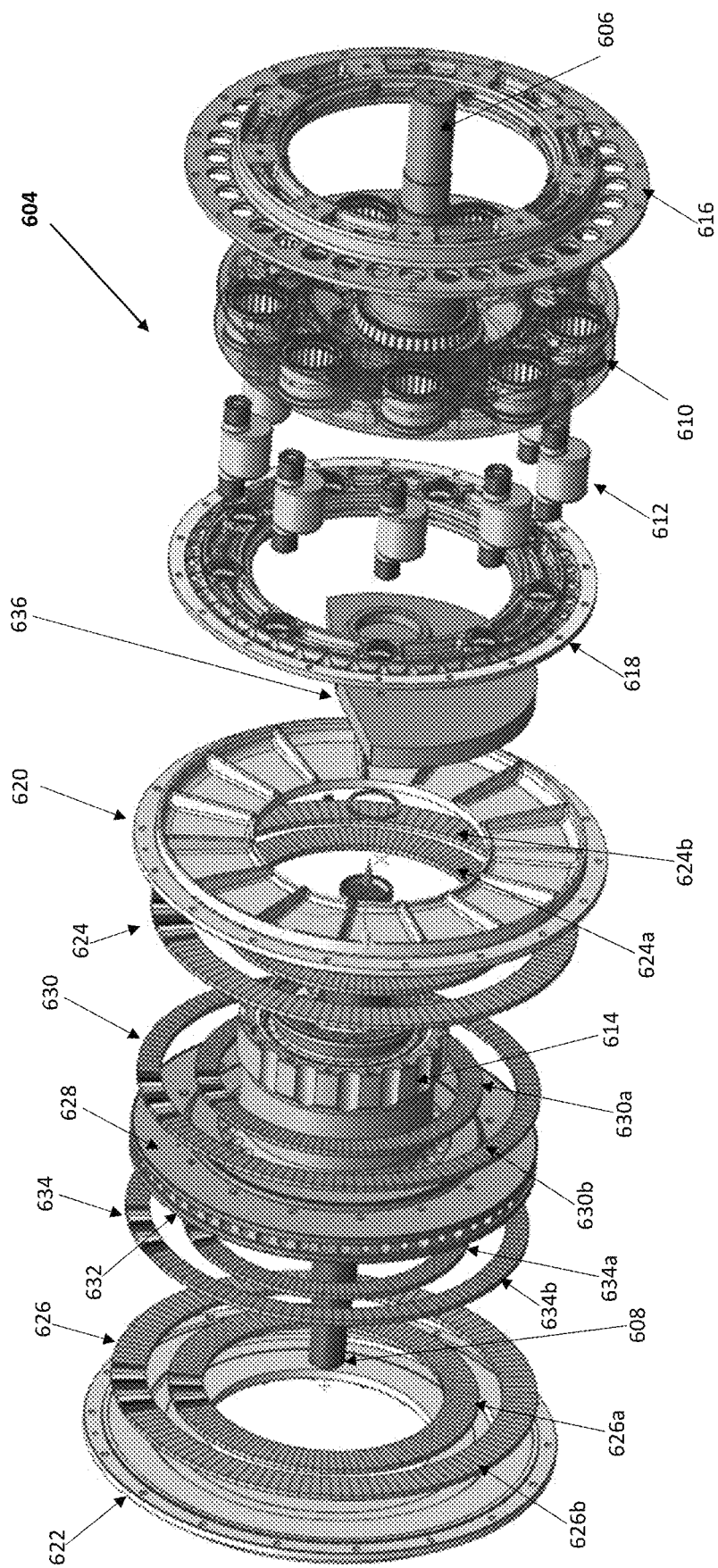
FIG. 6 is an illustration of an alternate embodiment of a cycloidal magnetic gear system.

FIG. 6 is an exploded view of an alternate embodiment of a gear system 604. As shown in FIG. 6, gear system 604 comprise a low-speed input shaft 606 that rotates concentrically and in-line with the centerline of an output shaft 608. The input shaft 606 is coupled to an orbital bearing plate 610 that comprises a plurality of orbital bearings and drive pins 612. The orbital bearing plate 610 imparts an eccentric orbit to a rotor 614 through the drive pins 612, rotor drive rings 616, 618 and a rotor drive flange (not shown in FIG. 6). The rotor 614 is positioned between a first stator plate 620 and a second stator plate 622. Affixed to the respective stator plates 620 and 622 is a first stator magnet 624 and a second stator magnet 626. Each stator magnet 624, 626 is comprised of at least two concentric rings of magnets—an inner ring 624a, 626a that is concentrically surrounded by an outer ring 624b, 626b.

Affixed to a first side 628 of the rotor 614 is a first rotor magnet 630, and affixed to a second side 632 of the rotor is a second rotor magnet 634. Each rotor magnet 630, 634 is comprised of at least two concentric rings of magnets—an inner ring 630a, 634a that is concentrically surrounded by an outer ring 630b, 634b. An output shaft 608 is coupled to the rotor 614. In FIG. 6, the magnets, both stator 624, 626 and rotor 630, 634 are arranged in a Halbach array. As the rotor 614 and its rotor magnets 630, 634 rotate eccentrically between the stator magnets 624, 626 as caused by the orbital bearing plate 610, the rotor 614 is configured to also rotate such that as the input shaft starts to turn, the magnetic fields on both sides of the rotor 614 try to prevent the rotor 614 from spinning, thereby forcing the output shaft 608 to turn in the opposite direction at the increased speed of the ratio of the magnetic poles between the rotor magnets 630, 634 and the stator magnets 624, 626. Also shown is a counterweight 636 affixed to the low-speed shaft 606. Though not shown in FIG. 6, such counterweights may also be affixed to the output shaft 608 (e.g., a high-speed shaft).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain and to illustrate improvements over the present state of the art in claimed invention.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A twin-turbine hydrokinetic energy system comprising:
    a turbine frame comprising:
        a top portion,
        a bottom portion opposite the top portion, and
        two sidewalls perpendicular to the bottom portion, the two sidewalls each comprising a single continuously curved convex surface, each of the single continuously curved convex surfaces facing inwardly towards two counter-rotating vertical turbine rotors and comprising an apex extending inwardly towards the two counter-rotating vertical turbine rotors to accelerate water through the turbine frame on an upstream side of the turbine frame and decelerate water on a downstream side of the turbine frame, wherein each particular sidewall comprises a unitary body of varying thickness with a point of maximum thickness corresponding to the apex of the particular sidewall;
    the two counter-rotating vertical turbine rotors housed within the turbine frame, wherein the two counter-rotating vertical turbine rotors are positioned within the turbine frame along a plane between the apex of each of the two sidewalls, each turbine rotor having a low solidity and comprising:
        a shaft connected to at least the top portion of the turbine frame;
        a top hub proximate a top portion of the shaft, the top hub hosting three upper arms;
        a bottom hub proximate a bottom portion of the shaft, the bottom hub hosting three lower arms; and
        three blades, wherein each blade is connected to an upper arm of the three upper arms and a lower arm of the three lower arms; and
    a single power take-off shaft that couples the two turbine rotors to a generator such that torque and rotational speed of the two turbine rotors is converted into power via the generator;
    wherein the unitary body of each sidewall comprises a single linear surface opposite the continuously curved convex surface and wherein both the single continuously curved convex surface and the single linear surface of each sidewall extend from a mouth of the turbine frame to an exit of the turbine frame.

2. The twin-turbine hydrokinetic energy system of claim 1, wherein each shaft is connected to the top portion and the bottom portion of the turbine frame by bearings.

3. The twin-turbine hydrokinetic energy system of claim 2, wherein each of the three upper arms extends over one of the three blades.

4. The twin-turbine hydrokinetic energy system of claim 3, wherein:
    each of the three blades comprising a particular thickness; and
    each of the three upper arms extends over one of the three blades by a distance at least equal to the particular thickness.

5. The twin-turbine hydrokinetic energy system of claim 4, wherein each turbine rotor has a solidity of less than 13 percent.

6. The twin-turbine hydrokinetic energy system of claim 5, wherein each of the top three arms and each of the bottom three arms are shaped to minimize drag force via NACA airfoil profiles.

7. The twin-turbine hydrokinetic energy system of claim 6, wherein:
    each turbine rotor further comprising a third hub approximately halfway between the top hub and the bottom hub;
    the third hub hosts three central arms; and
    each of the three central arms is connected to one of the three blades to provide stability and avoid bending.

8. The twin-turbine hydrokinetic energy system of claim 1, wherein the turbine rotors are shaped to maximize the velocity of the fluid that flows over the blades of the rotors so as to make optimal use of the velocity distribution of the fluid.

9. The twin-turbine hydrokinetic energy system of claim 1, wherein the varying thickness of the unitary body of each sidewall varies based on the curvature of the continuously curved convex surface.

10. A method for exploiting hydrokinetic energy existing in open-channels comprising:

accelerating water through a turbine frame on an upstream side via two hydrodynamically optimized sidewalls of the turbine frame, the turbine frame comprising:
- a base connected to the two hydrodynamically optimized sidewalls; and
- the two hydrodynamically optimized sidewalls each comprising a single continuously curved convex surface, each of the single continuously curved convex surfaces facing inwardly towards two counter-rotating vertical turbine rotors and comprising an apex extending inwardly towards the two counter-rotating vertical turbine rotors, wherein each particular hydrodynamically optimized sidewall comprises a unitary body of varying thickness with a point of maximum thickness corresponding to the apex of the particular hydrodynamically optimized sidewall;

converting kinetic energy of the water into mechanical torque via rotation of the two counter-rotating vertical turbine rotors housed within the turbine frame, wherein the two counterrotating vertical turbine rotors are positioned within the turbine frame along a plane between the apex of each of the two hydrodynamically optimized sidewalls, each turbine rotor having a low solidity and comprising:
- a shaft connected to at least a top portion of the turbine frame;
- a top hub proximate a top portion of the shaft, the top hub hosting three upper arms;
- a bottom hub proximate a bottom portion of the shaft, the bottom hub hosting three lower arms; and
- three blades, wherein each blade is connected to an upper arm of the three top arms and a lower arm of the three lower arms,
- wherein the unitary body of each sidewall comprises a single linear surface opposite the continuously curved convex surface and wherein both the single continuously curved convex surface and the single linear surface of each sidewall extend from a mouth of the turbine frame to an exit of the turbine frame; and
- wherein a power take-off shaft disposed between the two turbine rotors couples the two turbine rotors to a generator such that torque and rotational speed of the two turbine rotors is converted into power via the generator.

11. The method for exploiting hydrokinetic energy existing in the open-channels of claim 10, further comprising decelerating the water on a downstream side of the turbine frame.

12. The method for exploiting hydrokinetic energy existing in the open-channels of claim 10, wherein the varying thickness of the unitary body of each sidewall varies based on the curvature of the continuously curved convex surface.

13. A twin-turbine hydrokinetic energy system comprising:
- a turbine frame comprising a top portion, a bottom portion opposite the top portion, and two sidewalls perpendicular to the bottom portion, the two sidewalls each comprising a single continuously curved convex surface, each of the single continuously curved convex surfaces facing inwardly towards two counter-rotating vertical turbine rotors and comprising an apex extending inwardly towards the two counter-rotating vertical turbine rotors to accelerate water through the turbine frame on an upstream side of the turbine frame and decelerate water on a downstream side of the turbine frame, wherein each particular sidewall comprises a unitary body of varying thickness with a point of maximum thickness corresponding to the apex of the particular sidewall, wherein the unitary body of each sidewall comprises a single linear surface opposite the continuously curved convex surface and wherein both the single continuously curved convex surface and the single linear surface of each sidewall extend from a mouth of the turbine frame to an exit of the turbine frame; and
- the two counter-rotating vertical turbine rotors housed within the turbine frame, wherein the two counter-rotating vertical turbine rotors are positioned within the turbine frame along a plane between the apex of each of the two sidewalls, each turbine rotor having a solidity of less than 13 percent and comprising:
  - a shaft connected to the top portion and the bottom portion of the turbine frame by bearings;
  - a top hub proximate a top portion of the shaft, the top hub hosting three upper arms;
  - a bottom hub proximate a bottom portion of the shaft, the bottom hub hosting three lower arms; and three blades, wherein:
    - each blade is connected to an upper arm of the three upper arms and a lower arm of the three lower arms and comprises a particular thickness;
    - each of the three upper arms extends over one of the three blades by a distance at least equal to the particular thickness; and
    - each turbine rotor operates at a tip speed ratio of approximately 3; and
- a single power take-off shaft that couples the two turbine rotors to a generator such that torque and rotational speed of the two turbine rotors is converted into power via the generator.

14. The twin-turbine hydrokinetic energy system of claim 13, wherein the varying thickness of the unitary body of each sidewall varies based on the curvature of the continuously curved convex surface.

* * * * *